(12) United States Patent
Ramalingam et al.

(10) Patent No.: US 9,990,507 B2
(45) Date of Patent: Jun. 5, 2018

(54) ADAPTING DECOY DATA PRESENT IN A NETWORK

(71) Applicant: Amazon Technologies, Inc., Seattle, WA (US)

(72) Inventors: Harsha Ramalingam, Kirkland, WA (US); Jesper Mikael Johansson, Redmond, WA (US); James Connelly Petts, Redmond, WA (US); Dominique Imjya Brezinski, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days. days.

(21) Appl. No.: 14/872,880

(22) Filed: Oct. 1, 2015

(65) Prior Publication Data

US 2016/0019395 A1 Jan. 21, 2016

Related U.S. Application Data

(63) Continuation of application No. 13/849,772, filed on Mar. 25, 2013, now Pat. No. 9,152,808.

(51) Int. Cl.
*G06F 17/00* (2006.01)
*G06F 21/62* (2013.01)
*H04L 29/06* (2006.01)

(52) U.S. Cl.
CPC .......... *G06F 21/62* (2013.01); *H04L 63/1416* (2013.01); *H04L 63/1441* (2013.01); *H04L 63/1491* (2013.01); *H04L 63/30* (2013.01)

(58) Field of Classification Search
CPC .. H04L 63/1491; H04L 63/1441; H04L 63/30
See application file for complete search history.

(56) References Cited

U.S. PATENT DOCUMENTS

| | | | | |
|---|---|---|---|---|
| 5,440,723 A * | 8/1995 | Arnold | ................. | G06F 21/564 714/2 |
| 6,049,876 A * | 4/2000 | Moughanni | ......... | G06F 12/1441 711/163 |
| 6,253,243 B1 * | 6/2001 | Spencer | .............. | H04L 41/0213 709/223 |
| 6,687,833 B1 * | 2/2004 | Osborne | ................. | H04L 63/10 713/151 |
| 7,089,589 B2 * | 8/2006 | Chefalas | ................. | G06F 21/56 726/22 |
| 7,093,291 B2 * | 8/2006 | Bailey | ................... | H04L 63/083 713/183 |

(Continued)

OTHER PUBLICATIONS

Ramalingam, et al. U.S. Appl. No. 13/602,466. Use of Decoy Data in a Data Store, filed Sep. 4, 2012.

(Continued)

*Primary Examiner* — Techane Gergiso
(74) *Attorney, Agent, or Firm* — Thomas | Horstemeyer, LLP; Michael D'Aurelio; Jason Perilla

(57) ABSTRACT

Disclosed are various embodiments for obtaining policy data specifying decoy data eligible to be inserted within a response to an access of a data store. The decoy data is detected in the response among a plurality of non-decoy data based at least upon the policy data. An action associated with the decoy data is initiated in response to the access of the data store meeting a configurable threshold.

20 Claims, 4 Drawing Sheets

(56) References Cited

U.S. PATENT DOCUMENTS

| | | | | |
|---|---|---|---|---|
| 7,694,339 | B2* | 4/2010 | Blake | H04L 63/0227 709/220 |
| 7,950,060 | B1* | 5/2011 | Kennedy | G06F 21/56 726/24 |
| 7,962,756 | B2* | 6/2011 | Fagone | G06F 21/55 713/188 |
| 8,065,725 | B2* | 11/2011 | Zheng | H04L 63/0823 709/200 |
| 8,472,619 | B1* | 6/2013 | Trimberger | H04L 9/002 380/28 |
| 8,528,091 | B2* | 9/2013 | Bowen | G06F 21/566 713/168 |
| 8,549,643 | B1* | 10/2013 | Shou | G06F 21/556 455/410 |
| 8,650,215 | B2* | 2/2014 | Little | G06F 21/554 707/782 |
| 8,683,589 | B2* | 3/2014 | Munetoh | G06F 21/554 718/1 |
| 8,719,938 | B2* | 5/2014 | Chasko | H04L 63/06 713/189 |
| 8,752,174 | B2* | 6/2014 | Buford | H04L 63/1491 726/13 |
| 8,769,687 | B2* | 7/2014 | Hoefelmeyer | H04L 63/1425 726/23 |
| 8,819,825 | B2* | 8/2014 | Keromytis | H04L 63/145 709/205 |
| 8,955,143 | B1* | 2/2015 | Ramalingam | G06F 17/30864 713/161 |
| 9,027,126 | B2* | 5/2015 | Larkins | G06F 21/554 713/182 |
| 9,130,986 | B2* | 9/2015 | Troyansky | G06F 21/552 |
| 9,356,942 | B1* | 5/2016 | Joffe | H04L 63/1408 |
| 2002/0046351 | A1* | 4/2002 | Takemori | G06F 21/55 726/23 |
| 2002/0112190 | A1* | 8/2002 | Miyagawa | H04L 63/12 726/13 |
| 2002/0116635 | A1* | 8/2002 | Sheymov | G06F 9/445 726/24 |
| 2002/0133717 | A1* | 9/2002 | Ciongoli | H04L 63/1408 726/23 |
| 2004/0172557 | A1* | 9/2004 | Nakae | H04L 63/0227 726/22 |
| 2005/0114709 | A1* | 5/2005 | Moore | H04L 63/10 726/4 |
| 2005/0210534 | A1* | 9/2005 | Krishnamurthy | H04L 63/1408 726/23 |
| 2006/0161982 | A1* | 7/2006 | Chari | G06F 21/554 726/23 |
| 2006/0288414 | A1* | 12/2006 | Kuroda | G06F 21/567 726/24 |
| 2007/0271614 | A1* | 11/2007 | Capalik | H04L 63/1441 726/23 |
| 2007/0289018 | A1* | 12/2007 | Steeves | G06F 21/56 726/24 |
| 2009/0227281 | A1* | 9/2009 | Hammad | G06K 19/07309 455/550.1 |
| 2009/0241191 | A1* | 9/2009 | Keromytis | H04L 63/145 726/23 |
| 2009/0328204 | A1* | 12/2009 | Taoka | G06F 12/1491 726/22 |
| 2010/0071051 | A1* | 3/2010 | Choyi | H04L 63/145 726/12 |
| 2010/0077483 | A1* | 3/2010 | Stolfo | G06F 21/554 726/24 |
| 2010/0269175 | A1* | 10/2010 | Stolfo | G06F 21/55 726/22 |
| 2011/0214182 | A1* | 9/2011 | Adams | G06F 21/00 726/23 |
| 2011/0225417 | A1* | 9/2011 | Maharajh | G06F 21/10 713/150 |
| 2012/0084866 | A1* | 4/2012 | Stolfo | G06F 21/554 726/25 |
| 2012/0117653 | A1* | 5/2012 | Chow | G06F 21/566 726/24 |
| 2012/0151585 | A1* | 6/2012 | Lamastra | H04L 12/585 726/24 |
| 2012/0331553 | A1* | 12/2012 | Aziz | G06F 21/554 726/23 |
| 2013/0014020 | A1* | 1/2013 | Dixon | G06F 17/30861 715/738 |
| 2013/0269032 | A1* | 10/2013 | Chasko | H04L 63/06 726/23 |

OTHER PUBLICATIONS

Defense Advanced Research Projects Agency (Department of Defense). Anomaly Detection at Multiple Scales (ADAMS). http://publicintelligence.net/darpa-fog-computing/ Accessed Sep. 18, 2013.

Shachtman, Noah. Feds Look to Fight Leaks with 'Fog of Disinformation'. Wired Magazine, Jul. 3, 2012. Online content: http://www.wired.com/dangerroom/2012/07/fog-computing/. Accessed Sep. 18, 2013.

* cited by examiner

ADAPTING DECOY DATA PRESENT IN A NETWORK

CROSS-REFERENCE TO RELATED APPLICATIONS

This application is a continuation of and claims the benefit of U.S. patent application Ser. No. 13/849,772, entitled "ADAPTING DECOY DATA PRESENT IN A NETWORK," and filed Mar. 25, 2013, which is hereby incorporated by reference in its entirety.

BACKGROUND

In an age of information, data stores to store and access information are ubiquitous. Some information may be confidential with only a limited number of parties granted access to the information. However, identifying unauthorized access or use of the information may not always be possible.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to techniques for identifying potentially malicious activity through automated placement of decoy data into a response to an access of a data store and detection of the decoy data in locations other than where it was placed. Various criteria may be used to select the locations for placement of the decoy data, while the decoy data itself may be predefined or generated based on a set of encoding rules using, for example, steganographic and/or cryptographic techniques. Client applications making legitimate access requests to the data store may use an application framework in order to adapt or normalize any decoy data present in the response from the data store. The application framework may implement configurable policies in order to distinguish legitimate, authorized requests from unauthorized requests on the basis of various criteria. Signature data may be created to concisely describe the decoy data, which may then be distributed to one or more sentinels to begin examination. The sentinels may detect the decoy data based on comparison of the signature data with the data under examination. Various actions may be undertaken upon detection of decoy data that may be based upon the particular decoy data detected, as well as the role and location of the detecting sentinel. In the following discussion, a general description of the system and its components is provided, followed by a discussion of the operation of the same.

Figure 1:
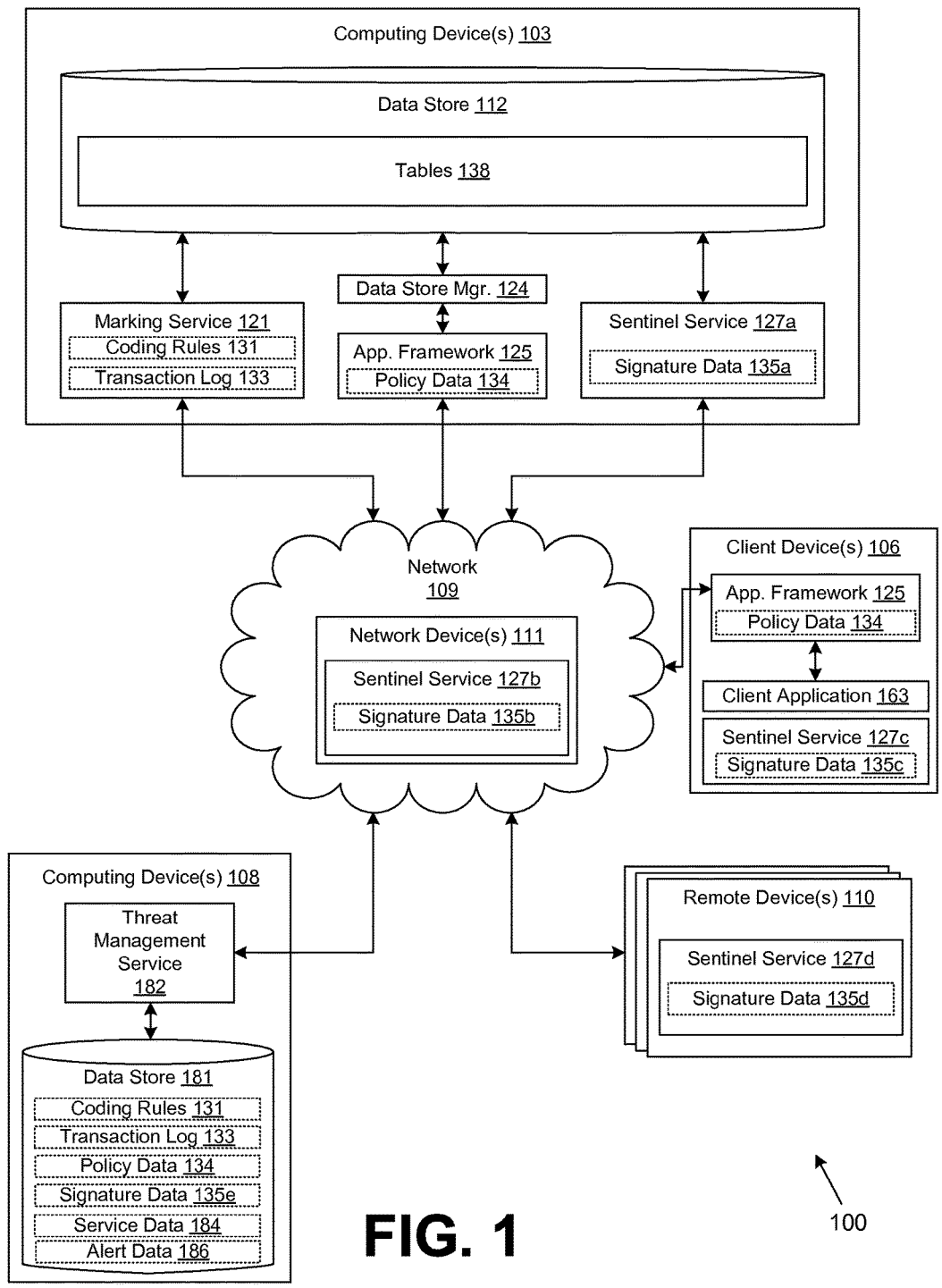
FIG. 1 is a drawing of a networked environment according to various embodiments of the present disclosure.

With reference to FIG. 1, shown is a networked environment 100 according to various embodiments. The networked environment 100 includes a computing device 103 in data communication with one or more clients 106 and a computing device 108 by way of the network 109. In some embodiments, other computing devices such as the remote devices 110 may also be in data communication with the computing device 108. The network 109 includes, for example, the Internet, intranets, extranets, wide area networks (WANs), local area networks (LANs), wired networks, wireless networks, or other suitable networks, etc., or any combination of two or more such networks. Data communication transiting the network 109 may be forwarded and/or examined by a network device 111.

The computing device 103 may comprise, for example, a server computer or any other system providing computing capability. Alternatively, the computing device 103 may comprise a plurality of servers or other computing devices that are arranged, for example, in one or more server banks or computer banks or other arrangements. For example, the computing device 103 may comprise a cloud computing resource, a grid computing resource, and/or any other distributed computing arrangement. The computing device 103 may be located in a single installation or may be distributed among many different geographical locations.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. As a non-limiting example, the data store 112 may comprise one or more relational databases, object oriented databases, document oriented databases, and/or other types of data stores as can be appreciated. The data stored in the data store 112, for example, is associated with the operation of the various applications and/or functional entities described below.

The components executed on the computing device 103, for example, include a marking service 121, a data store manager 124, an application framework 125, a sentinel service 127a, and other applications, services, processes, systems, engines, or functionality not discussed in detail herein. The marking service 121 is executed in order to facilitate identifying and/or creating tables within the data store 112 and including decoy data in responses to access of the given tables. To this end, the marking service 121 may insert the decoy data into the table to be included in responses, and/or the marking service 121 may insert decoy data only into the responses without insertion into the table. Despite the organizational view of tables stored as rows and columns, the data values may be stored in a different structure suitable for the particular data store 112. The decoy data may include the addition of data to the pre-existing data of a table and/or response, as well as potential modifications to the pre-existing data. As a non-limiting example, the modifications may include, for example, digital watermarks, steganography, cryptography, and/or other techniques for marking data as can be appreciated. In some embodiments, the marking service 121 may include coding rules 131, a transaction log 133, and/or other possible data.

The coding rules 131 comprise rules for identifying and/or creating tables within the data store 112 for marking, as well as the type of marking to be performed for a given table. The transaction log 133 comprises data associated with historical modifications of the tables 138 and/or responses made by the marking service 121. For a given table modified by the marking service 121, the transaction log 133 may include an identifier for a modified table, an identifier for one or more attribute types (e.g. columns) of decoy data inserted into the table, an identifier for one or more records (e.g. rows) of decoy data inserted into the table, decoy data values inserted, a time stamp for the access, authentication credentials associated with the access, and/or other data associated modifications to tables by the marking service 121.

The data store manager 124 is executed in order to facilitate creation, maintenance, and use of one or more tables within the data store 112. The data store manager 124 may support query languages or other types of "access" languages to specify criteria with which to report, insert, modify, and/or delete data values associated with the tables. The data store manager 124 may further provide facilities for controlling data access, enforcing data integrity, managing concurrency control, as well as maintaining database security. In some embodiments, the data store manager 124 may further offer an application programming interface (API) or other programmatic interface through which applications and/or "plug-in" program modules may interface with the data store manager to extend features and functionality.

The application framework 125 is executed in order to facilitate an authorized communication session between the data store manager 124 and the client device 106. To that end, the application framework 125 may use various authentication/authorization techniques, as well the policy data 134. The policy data 134 may include various heuristics that may be used to distinguish legitimate access of the data store 112 from an improper access. In some embodiments, the policy data 134 may further specify responsive actions based in part upon the determined legitimacy of the access and/or other possible factors.

The sentinel service 127*a-d* is executed in order to facilitate identifying the presence of decoy data located outside of the tables of the data store 112, as well as potentially act upon the identified decoy data. As a low-level service with privileged operating system permissions, the sentinel service 127*a-d* may operate in a manner similar to an antivirus or antimalware service. The decoy data may be identified based upon a comparison with portions of the signature data 135*a-e*. The signature data 135*a-e* may contain various types of information that may be employed to positively identify a given piece of data as being decoy data. As a non-limiting example, the signature data 135*a-e* may comprise text strings, checksums, hash values, metadata, decoding rules, and/or other types of identification data as can be appreciated. In some embodiments, the signature data 135*a-e* may further specify actions (e.g., transmitting an alert) to be taken in response to decoy data based upon the particular decoy data detected, the computing device in which the sentinel service 127*a-d* is executing, and/or other possible criteria. The actions may include modifications and/or other possible actions to be initiated upon the decoy data or co-mingled non-decoy data based upon the circumstances in which the decoy data is encountered.

The sentinel service 127*a* may examine data present in memory, in a table of the data store 112 other than where it was placed, stored in non-volatile storage, transiting a network interface, and/or in other locations of the computing device in which the sentinel service 127*a* is executing, such as the computing device 103. The sentinel serve 127*a* may communicate with the computing device 108 and/or other computing devices using various protocols such as, for example, hypertext transfer protocol (HTTP), simple object access protocol (SOAP), representational state transfer (REST), user datagram protocol (UDP), transmission control protocol (TCP), and/or other protocols for communicating data over the network 109.

The data stored in the data store 112 includes, for example, tables 138, and potentially other data. Each table in the tables 138 is a set of data values organized using a model of vertical columns and horizontal rows, wherein a table has a specified number of columns, but may have any number of rows. The types of data values represented in the tables 138 may include customer records, payment information, payment instruments (e.g., credit card information, debit card information, gift card information, prepaid card information, and stored value account information), confidential information, personally identifiable information, order histories, user credentials, salary information, sales information, gift certificates, web browser cookies, music, medical information, and/or other data as can be appreciated. Each of the tables 138 generally has associated metadata, such as constraints on the table and/or on the values within particular columns, descriptors for the table and/or columns, or other metadata as can be appreciated. Despite the organizational view of tables 138 stored as rows and columns, the data values may be stored in a different structure suitable for the data store 112.

The client 106 is representative of a plurality of client devices that may be coupled to the network 109. The client 106 may comprise, for example, a processor-based system such as a computer system. Such a computer system may be embodied in the form of a desktop computer, a server, a laptop computer, a personal digital assistant, a cellular telephone, set-top box, music players, web pads, tablet computer systems, game consoles, or other devices with like capability.

The client 106 may be configured to execute various applications such as an application framework 125, a client application 163, a sentinel service 127*c*, and/or other applications. During the course of execution, the client application 163 may obtain, via the application framework 125, data from the data store 112 potentially containing both decoy data and non-decoy data. The sentinel service 127*c*, as executed in the client 106, embodies the signature data 135*c* and is executed in order to facilitate identifying and responding to the presence of decoy data. The sentinel service 127*c* may examine data present in memory, stored in non-volatile storage, transiting a network interface, and/or other locations of the computing device in which the sentinel service 127*c* is executing, such as the client 106. In some embodiments, the functionality of the application framework 125 and/or sentinel service 127*c* may be embodied within the client application 163. In other embodiments, the application framework 125 and/or sentinel service 127*c* may function as a "plug-in" module to the client application 163.

The application framework 125, sentinel service 127*c*, and client application 163 may communicate with other computing devices using various protocols such as, for example, HTTP, SOAP, REST, UDP, TCP, and/or other protocols for communicating data over the network 109. The client 106 may be configured to execute applications beyond the application framework 125, sentinel service 127*c*, and client application 163 such as, for example, a browser application, email applications, instant message applications, and/or other applications.

The computing device 108 may comprise, for example, a server computing device or any other system providing computing capability. Alternatively, a plurality of computing devices 108 may be employed that are arranged, for example, in one or more computer banks or other arrangements. For example, a plurality of computing devices 108 together may comprise a cloud computing resource, a grid computing resource, and/or any other distributed computing arrangement. Such computing devices 108 may be located in a single installation or may be distributed among many different geographical locations. For purposes of convenience, the computing device 108 may be referred to herein in the singular. Even though the computing device 108 is referred to in the singular, it is understood that a plurality of computing devices 108 may be employed in the various arrangements as described above.

Various applications and/or other functionality may be executed in the computing device 108 according to various embodiments. Also, various data is stored in a data store 181 that is accessible to the computing device 108. The data store 181 may be representative of a plurality of data stores 181 as can be appreciated. The data stored in the data store 181, for example, is associated with the operation of the various applications and/or functional entities described below.

The components executed on the computing device 108, for example, include a threat management service 182, and other applications, services, processes, systems, engines, or functionality not discussed in detail herein. The threat management service 182 may correspond to a management application for the marking service 121 and the sentinel service 127a-d. To that end, the threat management service 182 may communicate with the marking service 121, application framework 125, and sentinel service 127a-d over various protocols such as, for example, HTTP, SOAP, REST, UDP, TCP, and/or other protocols for communicating data over the network 109. In some embodiments, the threat management service 182 may carry out some or all of these communications over a management network. The management network may be partitioned from the network 109 or may be a virtual private network overlay upon the network 109. The threat management service 182 may also present a user interface accessible through a web browser and/or other applications on the client 106 or other computing device.

The data stored in the data store 181 includes, for example, coding rules 131, a transaction log 133, policy data 134, signature data 135e, service data 184, alert data 186, and potentially other data. The service data 184 may comprise identifiers and authentication data associated with various deployed instances of the marking service 121, the application framework 125, and the sentinel service 127a-d. The service data 184 may further comprise network location information and/or priority information for the computing devices on which instances of the marking service 121, the application framework 125, and/or the sentinel service 127a-d are executing. The alert data 186 may comprise a set of alerts as reported by the deployed instances of the sentinel service 127a-d. The alerts may comprise an identifier for the computing device on which the sentinel service 127a-d is executing, the decoy data detected, where it was detected, the action attempted, result of the attempted action, and/or other possible data related to the incident as can be appreciated.

The remote device 110 may be configured to execute various applications such as a sentinel service 127d and/or other applications. The sentinel service 127d, as executed in the remote device 110, embodies the signature data 135d and is executed in order to facilitate identifying the presence of decoy data. The sentinel service 127d may examine data present in memory, stored in non-volatile storage, transiting a network interface, and/or other locations of the computing device in which the sentinel service is executing, such as the remote device 110. The sentinel serve 127d may communicate with the computing device 108 and/or other computing devices using various protocols such as, for example, HTTP, SOAP, REST, UDP, TCP, and/or other protocols for communicating data over the network 109. The remote device 110 may be configured to execute applications beyond the sentinel service 127d such as, for example, a browser application, email applications, instant message applications, and/or other applications.

The network device 111 is representative of a plurality of network devices that may forward and/or examine communication data transiting the network 109. The network device 111 may comprise, for example, a processor-based system such as a computer system. Such a computer system may be embodied in the form of a server, network router, a network switch, a network proxy, or other devices with like capability.

The network device 111 may be configured to execute various applications such as a sentinel service 127b and/or other applications. The sentinel service 127b, as executed in the network device 111, embodies the signature data 135b and is executed in order to facilitate identifying and responding to the presence of decoy data. The sentinel service 127b may examine data present in memory, stored in non-volatile storage, transiting a network interface, and/or other locations of the computing device in which the sentinel service 127b is executing, such as the network device 111. The sentinel service 127b may communicate with the computing device 108 and/or other computing devices using various protocols such as, for example, HTTP, SOAP, REST, UDP, TCP, and/or other protocols for communicating data over the network 109.

Next, a general description of the operation of the various components of the networked environment 100 is provided. To begin, an operator defines the instances of the marking service 121, the application framework 125, and the sentinel service 127a-d to be used in the service data 184. The definitions may include a network address, authentication data, a location of the computing device on which the service is executing, a priority of the service, and other possible information about each service as can be appreciated.

Additionally, the operator may provide coding rules 131 to the threat management service 182. The coding rules 131 identify specific tables or types of tables to be created and/or modified with decoy data, as well as the type(s) of marking to be performed for a given table. The marking may include specific decoy data to be inserted into the tables 138 and/or responses, rules for modifying pre-existing data to be decoy data, rules for generating decoy data, rules for creating tables 138, and/or other marking techniques as can be appreciated. The coding rules 131, policy data 134, and the service data 184 may be input through a user interface of the threat management service 182 or predefined elsewhere and imported into the data store 181.

As a non-limiting example, one of the coding rules 131 may be to identify tables containing confidential information such as name, address, telephone number, geolocation, uniquely identifying information, personal non-public information, and personally identifiable information. The rule for these tables may further include direction to add a column to the table of non-decoy, "actual" data to include credit card information as decoy data. The credit card information may be decoy data provided by credit card issuers and/or the decoy credit card numbers may be locally generated. Locally generated numbers may be created randomly, from a credit card number algorithm, and/or using other techniques as can be appreciated. In some embodiments, the locally generated credit card numbers may contain a valid credit card number check digit such that upon a cursory validation of the number, the credit card number would appear to be valid.

The operator may further specify various policy data 134 to be used by the application framework 125. The policy data 134 may include various heuristics that may be used to evaluate legitimacy of access of a data store 112 during the course of a communication session with the data store 112. In some embodiments, the policy data 134 may further specify responsive actions based in part upon the legitimacy of the access. As a non-limiting example, the policy data 134 may indicate that the tables 138 are typically accessed by selecting one record at a time, and that the maximum rate of record retrieval by a client is one record per second. In the event the access policy is violated during the course of a communication session (i.e., not likely a legitimate access), the policy data 134 may specify that any response retrieved from the access of data store 112 should be discarded. Alternatively, if the user request is characterized as legitimate, the policy data 134 may direct that the decoy data should be removed from a response from the data store 112, modifications to be made to the decoy data in the response, and/or other possible actions as can be appreciated.

The threat management service 182 may use the coding rules 131 to generate the decoy data detection portion of the policy data 134 and signature data 135a-e. The signature data 135a-e may be used to detect decoy data and may comprise, for example, text strings, checksums, hash values, metadata, detection rules, and/or other types of identification data as can be appreciated. As a non-limiting example, the coding rules 131 may comprise an instruction to insert a decoy credit card number of 4123 0987 5678 7890 into a table associated with customer order data. The signature data may contain the text string "4123 0987 5678 7890" to be matched, a cyclical redundancy check (CRC) checksum of the text string, a detection rule that a sum of the digits of the credit card number are a particular value, and/or other possible criteria for detecting decoy data as can be appreciated.

The threat management service 182 may distribute the coding rules 131, policy data 134, and signature data 135a-d to the respective instances of the marking service 121, application framework 125, and sentinel service 127a-d, the instances being defined in the service data 184. The distribution may occur using HTTP, HTTP over Transport Layer Security (TLS)/Secure Sockets Layer (SSL), File Transfer Protocol (FTP), FTP Secure (FTPS), or other data transfer protocols as can be appreciated. As described previously, in some embodiments all or a portion of the distribution may occur over a management network.

The distribution may further use authentication credentials to confirm the identity of the instances of the marking service 121, application framework 125, and sentinel service 127a-d. In some embodiments, only portions of the coding rules 131, policy data 134, and/or the signature data 135a-d may be distributed to the respective services based at least upon location and/or function of the computing device in which the service is executing. As a non-limiting example, a coding rule 131 associated with inserting decoy data into tables of customer information may not be applicable for a computing device without tables containing customer information.

Thereafter, the instances of the marking service 121 may begin an examination of the tables 138 to identify and/or create tables conforming to the criteria of the coding rules 131 and include decoy data in responses to access of the tables 138 accordingly. To this end, the marking service 121 may insert the decoy data into the table to be included in responses, and/or the marking service 121 may insert decoy data only into the responses without insertion into the table.

In some embodiments, the decoy data inserted may be unique to the data store 112, unique to a user accessing the tables 138, unique to a client device 106, unique to a particular access of the tables 138, and/or uniquely identifiable upon another basis as can be appreciated. Among other possible benefits, the use of uniquely identifiable decoy data may aid in tracing the decoy data to the original source. The marking service 121 may identify pre-existing tables 138 based upon metadata for the tables 138, examination of the data values within the tables 138, and/or other possible techniques. As a non-limiting example, the coding rules 131 may instruct the marking service 121 to identify ones of the tables 138 having customer names, where none of the customer names include a middle initial. The coding rules 131 may further instruct the marking service 121 to insert decoy data of randomly generated letters as middle initials into the customer name field for responses to access of those tables 138 having a customer name.

Activities of identification and marking performed by the marking service 121 may be stored in the transaction log 133. The transaction log 133 may be periodically transmitted to the threat management service 182 for collection. In some embodiments, the signature data 135a-e may be adjusted based upon the transaction log 133. For example, if the signature data 135a-e includes detection techniques for decoy data that the transaction log 133 indicates has never been used, the particular detection technique may be removed from the signature data 135a-e until the transaction log 133 indicates the decoy data has actually been applied.

The client application 163 may access the tables 138 of the data store 112 through a communication session with the data store manager 124. The communication session may be facilitated by one or more instances of the application framework 125 executing in the computing device 103 and/or client device 106. The policy data 134, as embodied by the application framework 125, may further specify modifications and/or other possible actions to be initiated upon any decoy data encountered in the response to the access of the data store 112 based upon the circumstances in which the decoy data is encountered. The actions may be based on the identity of the user accessing the data, the computing device in which the access is carried out, the manner in which the data is accessed, and/or other circumstances as can be appreciated.

As a non-limiting example, various user records and a column of credit card information have been previously added as decoy data to a table 138 of customer information. The policy data 134 may specify that credit card information should never be legitimately accessed, while legitimate requests may include the decoy user records. The policy data 134 may further provide a general directive that if the data store 112 is accessed in the manner specified in the policy data 134, then any decoy data present in a response should be removed. Continuing the example, if a user accesses the credit card information, the application framework 125 may interrupt delivery of a response to the client application 163.

However, if the user issues a request from the data store 112 that includes the decoy user records, but no credit card information, the threshold for legitimacy has been met and the decoy data (e.g., the decoy user records) may be removed from the response. As described previously, various criteria may be specified in the policy data 134 to distinguish legitimate requests of the data store 112 from improper requests.

In various embodiments, rather than removing the decoy data, the policy data 134 may direct the application framework 125 to modify the decoy data with a counter, a timestamp, an identifier, and/or other possible modifications. The modification may be carried out be replacing a portion of the decoy data, inserting additional data in the response, performing an exclusive disjunction (XOR) operation on a portion of the decoy data, and/or other techniques as can be appreciated. Thereafter, if the client application 163 communicates the response, including the decoy data, to other client devices 106 through the application framework 125, the decoy data may be further modified through similar operations.

The sentinel service 127 may be executed in the computing device 103, the client device 106, the remote device 110, the network device 111, and/or other computing devices in order to detect the presence of decoy data outside the data store 112 or other data stores in which it was placed. The decoy data may be identified based upon a comparison with portions of the signature data 135*a-e*. The signature data 135*a-e* may contain various types of information that may be employed to positively identify and react to a given piece of data as being decoy data.

The sentinel service 127*a-d* may examine data present in memory, in a table of the data store 112 other than where it was placed, stored in non-volatile storage, transiting a network interface, and/or other locations of the computing devices in which the sentinel service 127*a-d* is executing. Descriptors of the various decoy data, as well as possibly actions to initiate upon detection of the decoy data may be specified in the signature data 135*a-d* embodied in each instance of the sentinel service 127*a-d*.

In response to detection of decoy data, the sentinel service 127*a-d* may take a variety of possible actions as may be defined in the signature data 135*a-d*. The actions may also include, for example, logging the details about the circumstances of the detected incident, transmitting an alert to the threat management service 182, quarantine the data associated with the decoy data, terminating the process accessing the decoy data, and/or other possible actions as can be appreciated. The action(s) taken may depend in part upon the particular decoy data detected, the location of the computing device in which the sentinel service 127*a-d* is executing, the priority of the computing device in which the sentinel service 127*a-d* is executing, and/or other possible criteria.

As a non-limiting example, the sentinel service 127*b* executing in a network device 111 near the source of the decoy data may simply transmit an alert for detected decoy data on a network interface because false-positives at this location may be high and the risk of consequential damage is low due to the location. However, a network device 111 operating at an exit point of a network 109 may choose to interrupt the data communication containing the decoy data, as well as non-decoy data, because of the high risk that the data access may not have been authorized.

In some embodiments, the sentinel service 127*d* may be executed by computing devices such as the remote devices 110 that are not within the same administrative domain as the other devices of the networked environment 100. As a non-limiting example, these remote devices 110 may include personal computers for home use, servers used by other businesses, routers and switching devices used by Internet service providers, and/or other types of computing devices as can be appreciated. It may be desirable to identify decoy data that has been removed from the administrative domain in which it originated. Using the signature data 135*d*, the sentinel service 127*d* executing in the remote devices 110 may identify given decoy data as originating at particular source. If this decoy data is detected by the sentinel service 127*d* executing in a remote device 110, a notification of the event may be sent to the specified source.

Thereafter, the sentinel service 127*d* executing in the remote device 110 may provide the decoy data to the threat management service 182 for examination. Using various techniques previously described such as, for example, using unique decoy data and marking decoy data with identifiers and/or counters, the threat management service 182 may analyze the data to support investigating the data breach. Likewise, the signature data 135*d* used by computing devices within any administrative domain, may be configured to recognize decoy data originating in other domains. Notification of decoy data detection may be sent to these other domains by the detecting computing device itself and/or by a centralized reporting service such as the threat management service 182.

In some embodiments, within a remote device 110, neither the sentinel service 127*d* nor the signature data 135*d* may indicate precisely what portion of the data is the actual decoy data. The decoy data may be obfuscated in this manner in order to provide a measure of confidentiality that may prevent malicious users from rapidly detecting and removing any decoy data present. To that end, signature data 135*d* provided to instances of the sentinel service 127*d* executing in remote devices 110 may be encrypted, use decoy data detection operations that may not be easily reversed such as cryptographic hashing, and/or other possible techniques.

Figure 2:
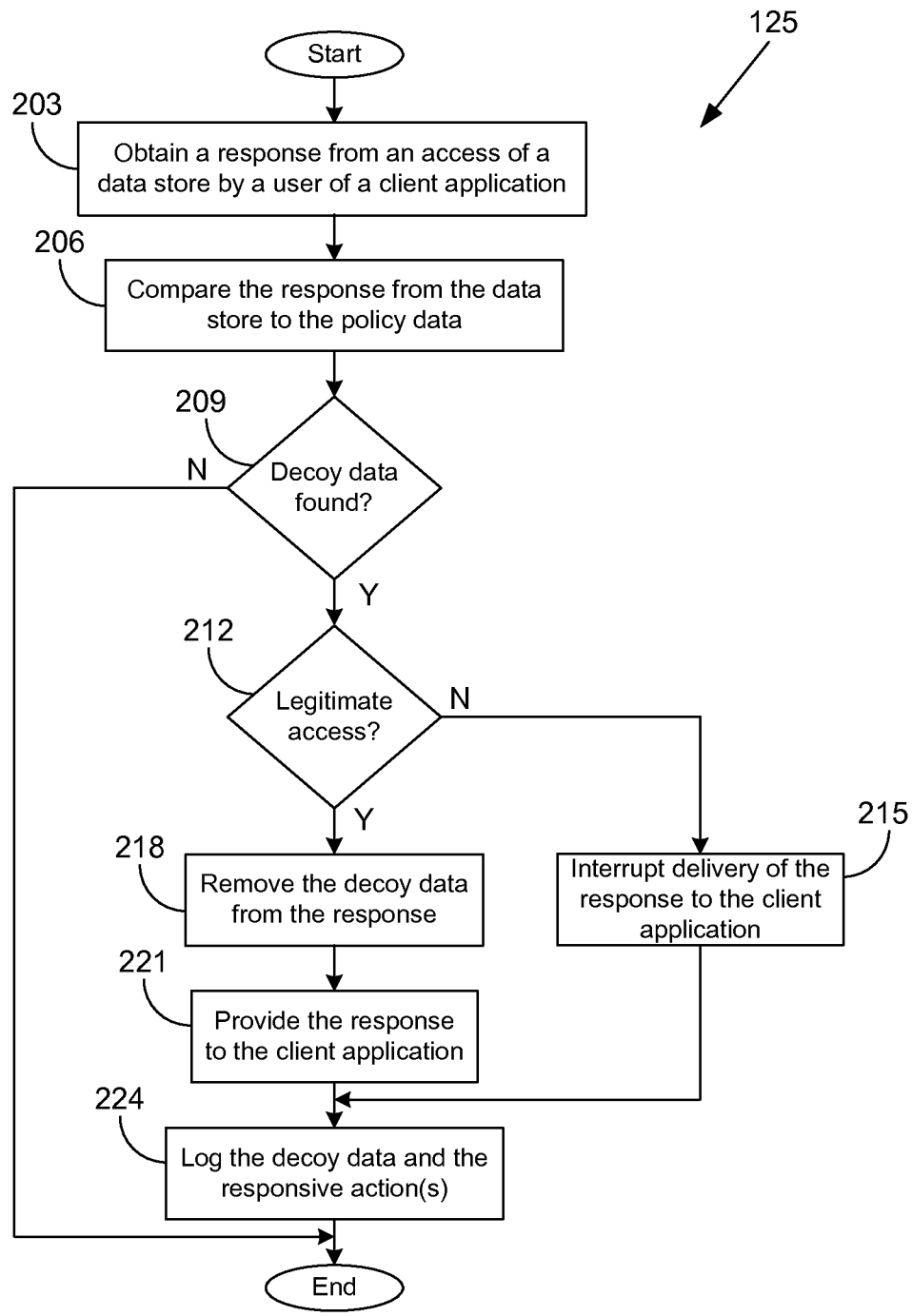
FIG. 2 is a flowchart illustrating one example of functionality implemented as portions of an application framework executed in a computing device in the networked environment of FIG. 1 according to various embodiments of the present disclosure.

Referring next to FIG. 2, shown is a flowchart that provides one example of the operation of a portion of the application framework 125 according to various embodiments. It is understood that the flowchart of FIG. 2 provides merely an example of the many different types of functional arrangements that may be employed to implement the operation of the portion of the application framework 125 as described herein. As an alternative, the flowchart of FIG. 2 may be viewed as depicting an example of steps of a method implemented in the client device 106 (FIG. 1) and/or other computing devices shown in the networked environment 100 (FIG. 1) according to one or more embodiments.

This exemplary execution of the application framework 125 may be carried out in tandem with a client application 163 (FIG. 1) executing in the client device 106. This portion of the execution of the application framework 125 may be executed subsequent to the client application 163 accessing the data store 112 (FIG. 1) on behalf of a user. Beginning with block 203, the application framework 125 may obtain the data received in the response to the access of the data store 112.

Next, in block 206, the application framework 125 examines available data of the response in order to detect the presence of decoy data outside the data store 112 or other data stores in which it was placed. The decoy data may be identified based upon a comparison with portions of the policy data 134. Then, in block 209, the application framework 125 determines if the examination indicates the presence of decoy data. If the examination of the data does not indicate the presence of decoy data, thereafter this portion of the execution of the application framework 125 ends as shown. The application framework 125 may be re-invoked when additional response data from the data store 112 is to be examined.

Alternatively, if the examination does indicate the presence of decoy data, in block 212, the application framework 125 determines whether the prior access of the tables 138 (FIG. 1) by the client application 163 was legitimate. As described previously, the policy data 134 may provide various factors for determining legitimacy of an access such as traditional user authentication/authorization techniques, thresholds, behavioral classifiers, and/or other possible factors as can be appreciated. If the access does not appear to be legitimate, in block 215, the application framework 125 may interrupt delivery of the response to the client application 163 and/or other possible actions as may be specified in the policy data 134. Thereafter, the execution of the application framework 125 may proceed to block 224. However, if the access by the user appears to be legitimate, then, in block 218, the application framework 125 may remove the decoy data from the data of the response. It should be noted that the policy data 134 specifies the actions and the circumstances in which they are to be carried out. The actions described here are merely some of the possible actions that have been described previously.

Next, in block 221, the application framework 125 may provide the data of the response, including any modifications, back to the client application 163. Then, in block 224, the application framework 125 logs details of the decoy data encountered and the action(s) undertaken. The application framework 125 may store a log locally and/or transmit the information to the computing device 108 (FIG. 1) to be stored in the transaction log 133 (FIG. 1). Thereafter, this portion of the application framework 125 ends as shown. The application framework 125 may be re-invoked when additional response data from the data store 112 is to be examined.

Figure 3:
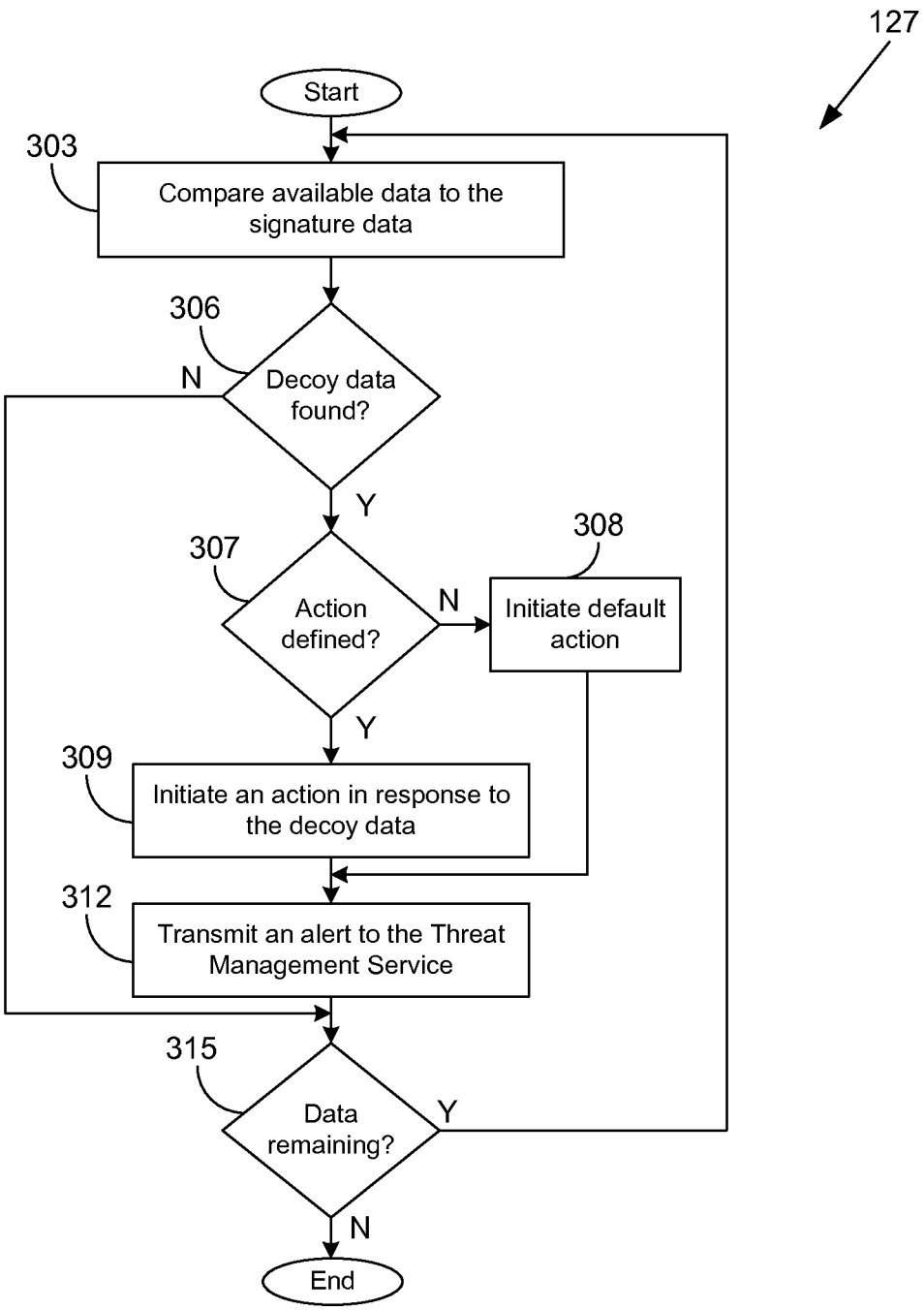
FIG. 3 is a flowchart illustrating another example of functionality implemented as portions of a sentinel service executed in a computing device in the networked environment of FIG. 1 according to various embodiments of the present disclosure.

Turning now to FIG. 3, shown is a flowchart that provides an example of the operation of a portion of the sentinel service 127a-d according to various embodiments. It is understood that the flowchart of FIG. 3 provides merely an example of the many different types of functional arrangements that may be employed to implement the operation of the portion of the sentinel service 127a-d as described herein. As an alternative, the flowchart of FIG. 3 may be viewed as depicting an example of steps of a method implemented in the computing device 103 (FIG. 1) and/or other computing devices shown in the networked environment 100 (FIG. 1) according to one or more embodiments.

This portion of the execution of the sentinel service 127a-d may be executed based on the presence of unexamined data and/or an update to the signature data 135a-d (FIG. 1). Beginning with block 303, the sentinel service 127a-d examines available data in order to detect the presence of decoy data outside the data store 112 (FIG. 1) or other data stores in which it was placed. The decoy data may be identified based upon a comparison with portions of the signature data 135a-d. The signature data 135a-d may contain various types of information that may be employed to positively identify a given piece of data as being decoy data. The sentinel service 127a-d may examine data present in memory, in a table of the data store 112 other than where it was placed, stored in non-volatile storage, transiting a network interface, and/or other locations of the computing devices in which the sentinel service 127a-d is executing.

Next, in block 306, the sentinel service 127a-d determines if the data under examination matches the signature data 135a-d, thus indicating the presence of decoy data. If the data under examination does not match the signature data 135a-d, execution of the sentinel service proceeds to block 315. Alternatively, if the data under examination does match the signature data 135a-d, in block 307, the sentinel service 127a-d determines if a specific action is defined for the decoy data detected.

The actions may include, for example, logging the details about the circumstances of the detected incident, quarantining the data associated with the decoy data, terminating the process accessing the decoy data, and/or other possible actions as can be appreciated. The action(s) taken may depend in part based upon the particular decoy data detected, the location of the computing device in which the sentinel service 127a-d is executing, the priority of the computing device in which the sentinel service 127a-d is executing, and/or other possible criteria. If no specific action is defined, in block 308, the sentinel service 127a-d may initiate a default action such as, for example, logging details associated with detection of the decoy data. Alternatively, if an action is defined for the decoy data, then in block 309, the action may be initiated by the sentinel service 127a-d.

Next, in block 312, the sentinel service 127a-d may transmit an alert to the threat management service 182 (FIG. 1) and/or other computing device on the network 109 (FIG. 1). Then, in block 315, the sentinel service 127a-d determines whether additional data remains to be compared to the signature data 135a-d. If no further data exists, this portion of the execution of the sentinel service 127a-d ends as shown. This portion of the sentinel service 127a-d may be reactivated upon receiving additional data to examine and/or changes to the signature data 135a-d. Alternatively, if additional data does exist to examine, execution of this portion of the sentinel service 127a-d returns to block 303.

Figure 4:
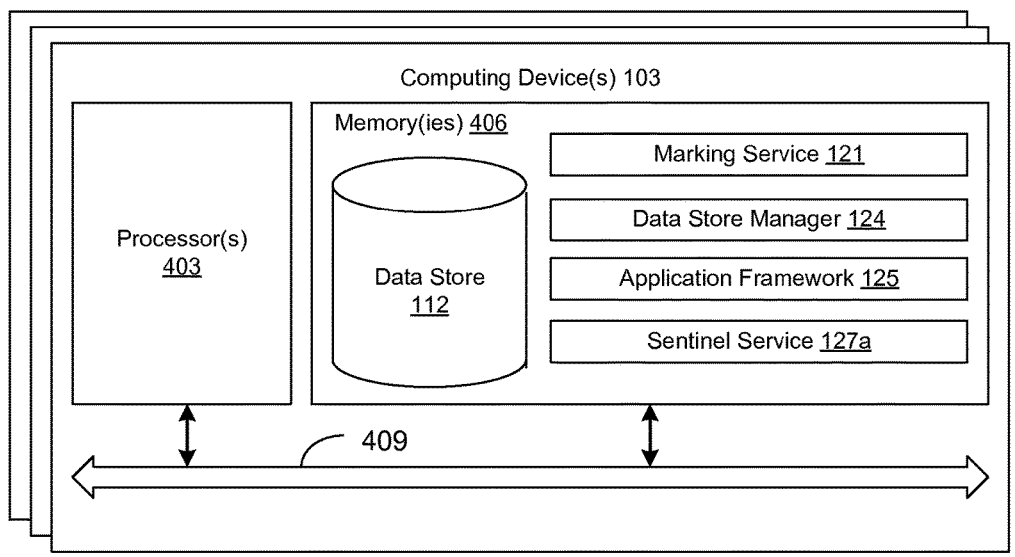
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the marking service 121, the data store manager 124, the application framework 125, the sentinel service 127a, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the marking service 121, the data store manager 124, the application framework 125, the sentinel service 127a-d, threat management service 182, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of implementations of respective portions of the application framework 125 and the sentinel service 127a-d. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the marking service 121, the data store manager 124, the application framework 125, the sentinel service 127a-d, and threat management service 182, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed, causing the at least one computing device to at least:
   obtain policy data, the policy data specifying decoy data eligible to be inserted in a data store and an access policy for accessing the data store;
   obtain a response to an access of the data store, the response to the access of the data store comprising the decoy data among a plurality of non-decoy data;
   determine legitimacy of the access of the data store based at least in part upon a comparison between the access policy and a characteristic associated with the access of the data store; and
   remove the decoy data from among the plurality of non-decoy data in the response to the access of the data store based at least in part upon the access being legitimate according to the access policy.

2. The non-transitory computer-readable medium of claim 1, wherein the program further causes the at least one computing device to at least:
   obtain signature data to identify the decoy data in the response to the access of the data store, the signature data further specifying an action associated with the decoy data;
   detect the decoy data in the response to the access of the data store via a scan of a plurality of data communications of a network with reference to the signature data, one of the data communications comprising the response to the access of the data store; and
   initiate the action associated with the decoy data based at least in part upon the detection of the decoy data.

3. The non-transitory computer-readable medium of claim 2, wherein the action comprises interrupting the one of the data communications comprising the response to the access of the data store.

4. A system, comprising:
   at least one computing device connected to a network, the at least one computing device configured to at least:
      obtain policy data, the policy data specifying decoy data eligible to be inserted in a data store and an access policy for accessing a data store;
      obtain a response to an access of the data store, the response to the access of the data store comprising the decoy data among a plurality of non-decoy data;
      determine legitimacy of the access of the data store based at least in part upon a comparison between the access policy and a characteristic associated with the access of the data store; and
      remove the decoy data from among the plurality of non-decoy data in the response to the access of the data store based at least in part upon the access being legitimate according to the access policy.

5. The system of claim 4, wherein the decoy data is inserted into the response without insertion into at least one table in the data store comprising the plurality of non-decoy data.

6. The system of claim 4, wherein the decoy data is inserted into at least one table in the data store comprising the plurality of non-decoy data.

7. The system of claim 4, wherein the at least one computing device is further configured to at least log details about the access of the data store based at least in part upon the legitimacy of the access.

8. The system of claim 4, wherein the at least one computing device is further configured to terminate the access of the data store based at least in part upon the legitimacy of the access.

9. The system of claim 4, wherein the access policy defines a rate of access of the data store.

10. The system of claim 4, wherein the access policy defines at least one attribute that, when included in the response, indicates the access as illegitimate.

11. The system of claim 4, wherein the at least one computing device is further configured to at least:
    obtain signature data to identify the decoy data previously inserted in the response to the access of the data store, the signature data further specifying an action associated with the decoy data;
    detect the decoy data in the response to the access of the data store via a scan of a plurality of data communications of the network with reference to the signature data, one of the data communications comprising the response to the access of the data store; and
    initiate the action associated with the decoy data based at least in part upon the detection of the decoy data.

12. The system of claim 11, wherein the action comprises interrupting the one of the data communications comprising the response to the access of the data store.

13. A method, comprising:
    obtaining, by at least one computing device, policy data specifying decoy data eligible to be inserted within a response to an access of a data store and further specifying an access policy threshold associated with a user accessing the data store;
    detecting, by the at least one computing device, the decoy data in the response to the access of the data store among a plurality of non-decoy data based at least upon the policy data;
    determining, by the at least one computing device, legitimacy of the access of the data store based at least in part upon the access policy threshold;
    interrupting, by the at least one computing device, delivery of the response to the access of the data store to a client application when the access does not meet the access policy threshold; and
    modifying, by the at least one computing device, the decoy data among a plurality of non-decoy data in the response to the access of the data store when the access meets the access policy threshold.

14. The method of claim 13, further comprising removing, by the at least one computing device, the decoy data from the response when the access meets the access policy threshold.

15. The method of claim 13, further comprising logging, by the at least one computing device, details about the access of the data store when the access does not meet the access policy threshold.

16. The method of claim 13, further comprising inserting, by the at least one computing device, low-priority decoy data within the response to the access of the data store when the access meets the access policy threshold.

17. The method of claim 16, wherein the low-priority decoy data comprises a timestamp.

18. The method of claim 13, wherein the access policy threshold defines a rate of access of the data store.

19. The method of claim 13, further comprising:
   obtaining, by the at least one computing device, signature data to identify the decoy data in the response to the access of the data store, the signature data being encrypted;
   detecting, by the at least one computing device, the decoy data in the response to the access of the data store via a scan of a memory of a second computing device; and
   transmitting, by the at least one computing device, a notice to a central reporting site based at least in part upon the detection of the decoy data, the notice including the decoy data.

20. The method of claim 19, wherein the notice further includes at least a portion of the plurality of non-decoy data, the decoy data being detected, but not located among the plurality of non-decoy data.

* * * * *